United States Patent
Scaramucci et al.

[15] 3,647,179
[45] Mar. 7, 1972

[54] SPLIT BODY VALVE ASSEMBLY

[72] Inventors: Domer Scaramucci, Oklahoma City; Ladd M. Adams, Norman, both of Okla.

[73] Assignee: Balon Corporation, Oklahoma City, Okla.

[22] Filed: Oct. 6, 1969

[21] Appl. No.: 863,863

[52] U.S. Cl. ............................251/172, 251/174, 251/315, 251/317, 251/367
[51] Int. Cl. ...............................................F16k 3/02
[58] Field of Search...............251/315, 316, 317, 172, 174, 251/367

[56] References Cited

UNITED STATES PATENTS

| | | |
|---|---|---|
| 3,006,602 | 10/1961 | Usab..................................251/317 X |
| 3,124,334 | 3/1964 | Szohatzky..........................251/315 X |
| 3,195,560 | 7/1965 | Pofit..................................251/315 X |
| 3,214,135 | 10/1965 | Hartmann..........................251/317 X |
| 3,276,740 | 10/1966 | Clark.....................................251/315 |

Primary Examiner—Harold W. Weakley
Attorney—Dunlap, Laney, Hessin and Dougherty

[57] ABSTRACT

A valve assembly, having two separate body components which are sized and adapted to form the valve body in such a manner that the vertical and horizontal orientation of the two body components with respect to each other and with respect to the valve member and valve stem is assured. The valve assembly also includes axially insertable seats and/or a composite seat, each being sized and adapted to assure the sealing integrity of the valve assembly when the valve member is in the open or the closed position.

26 Claims, 8 Drawing Figures

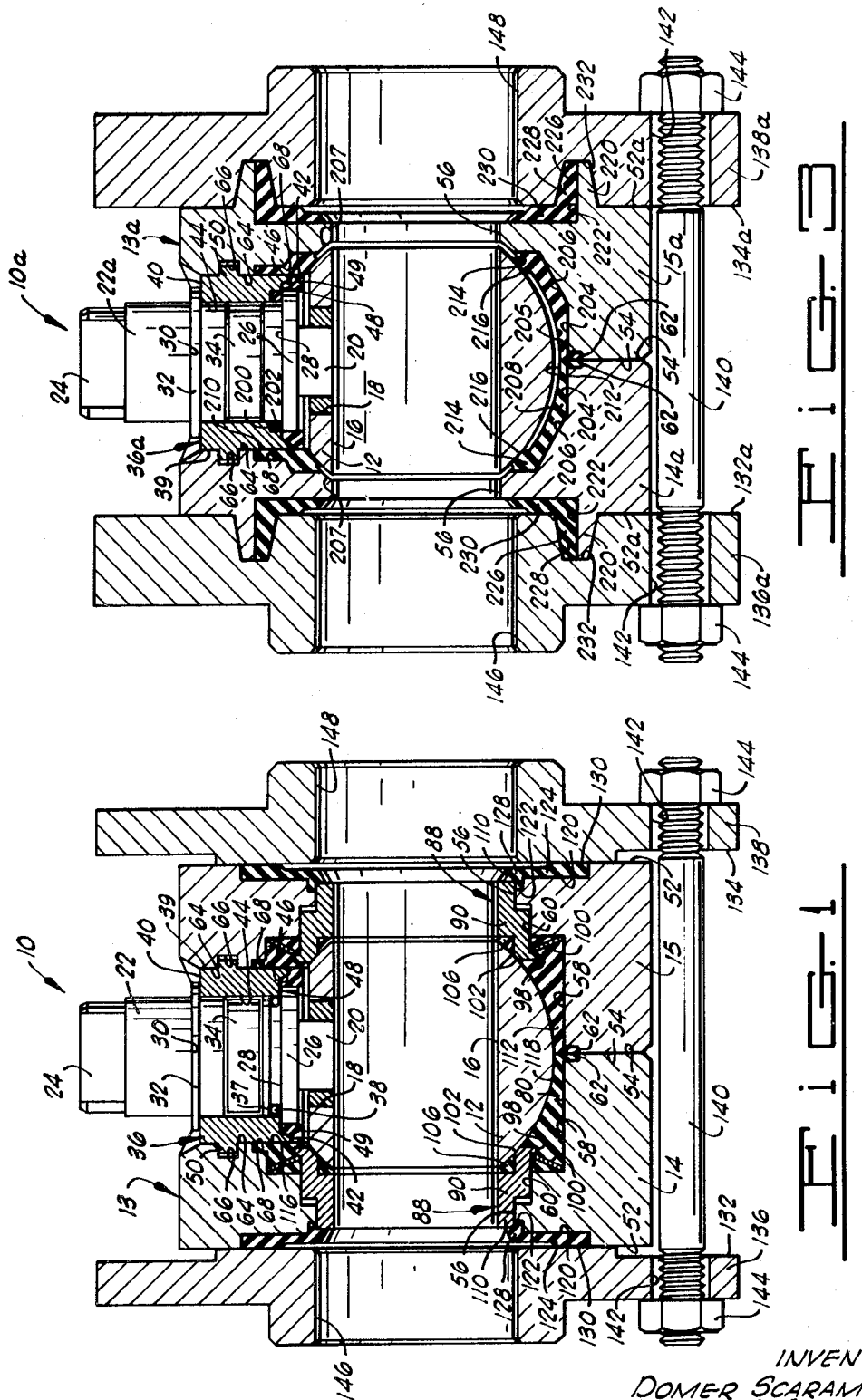

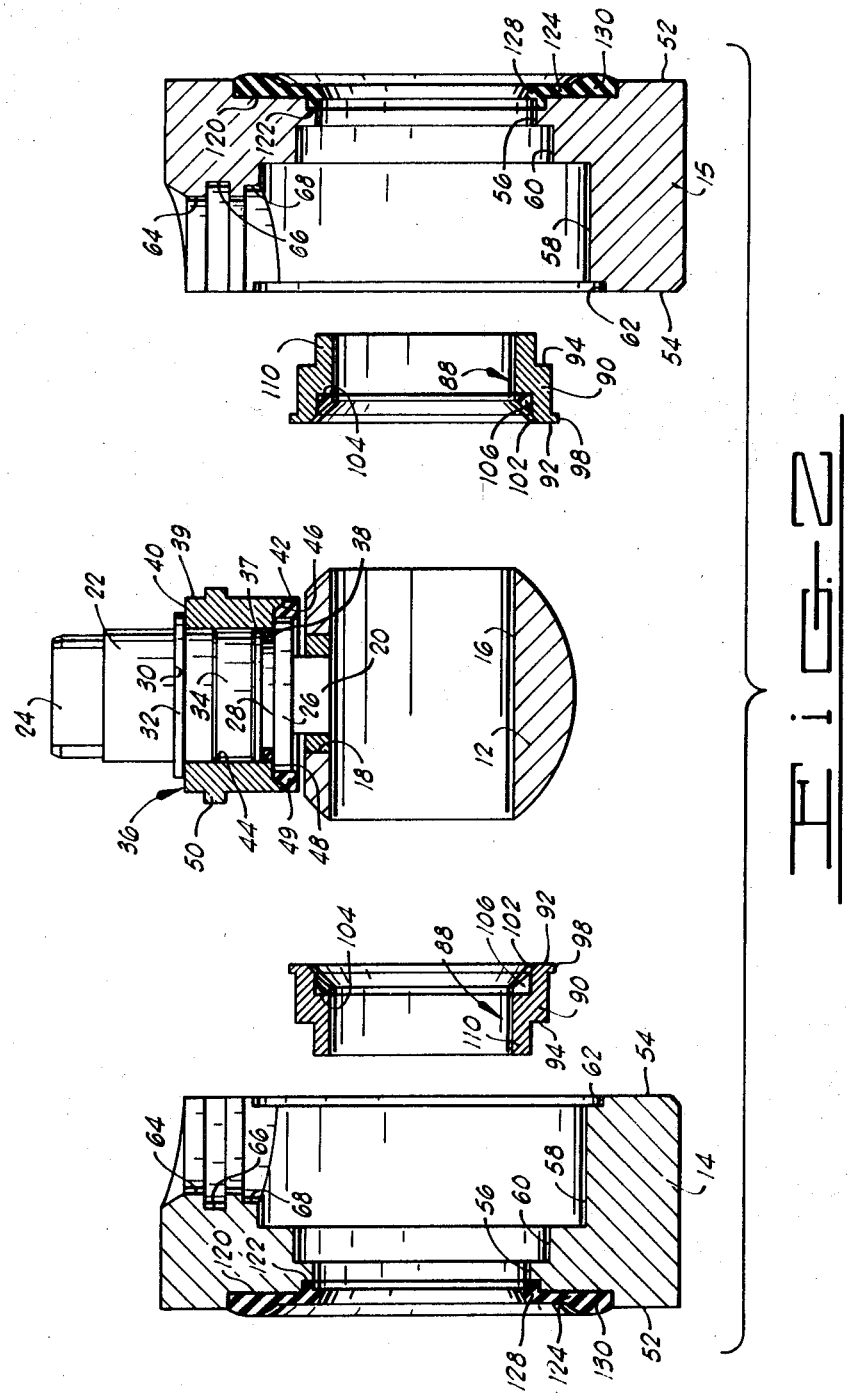

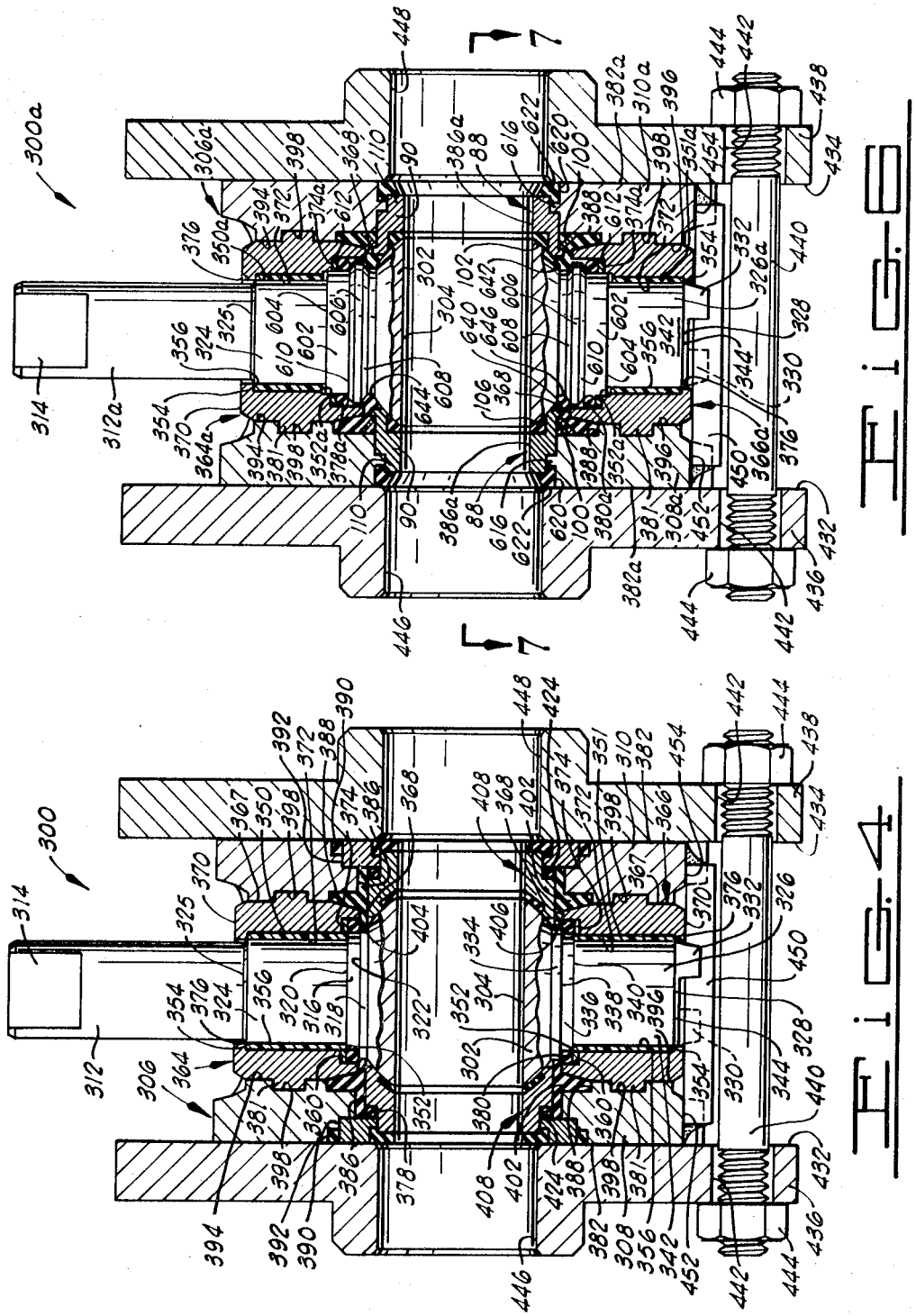

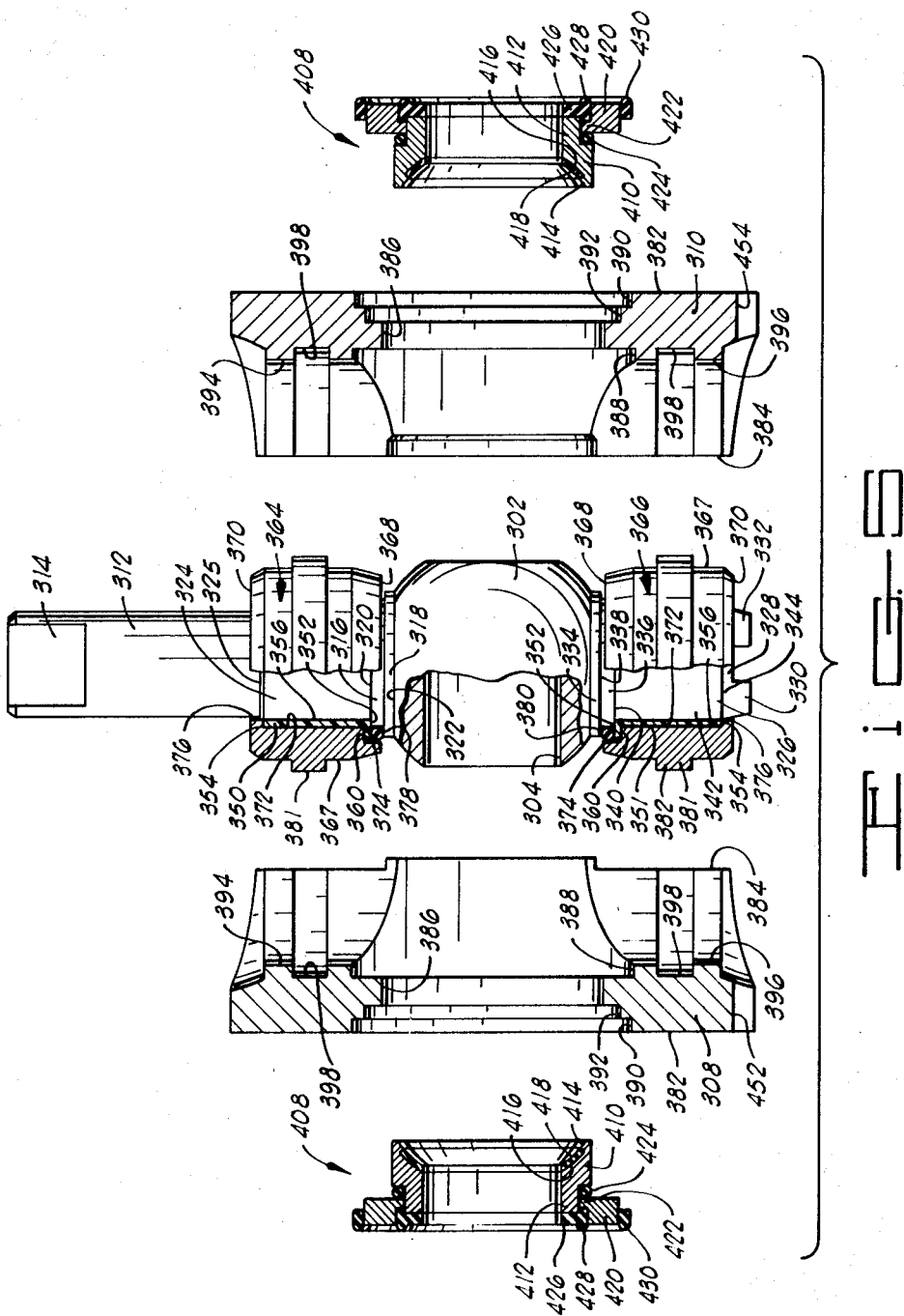

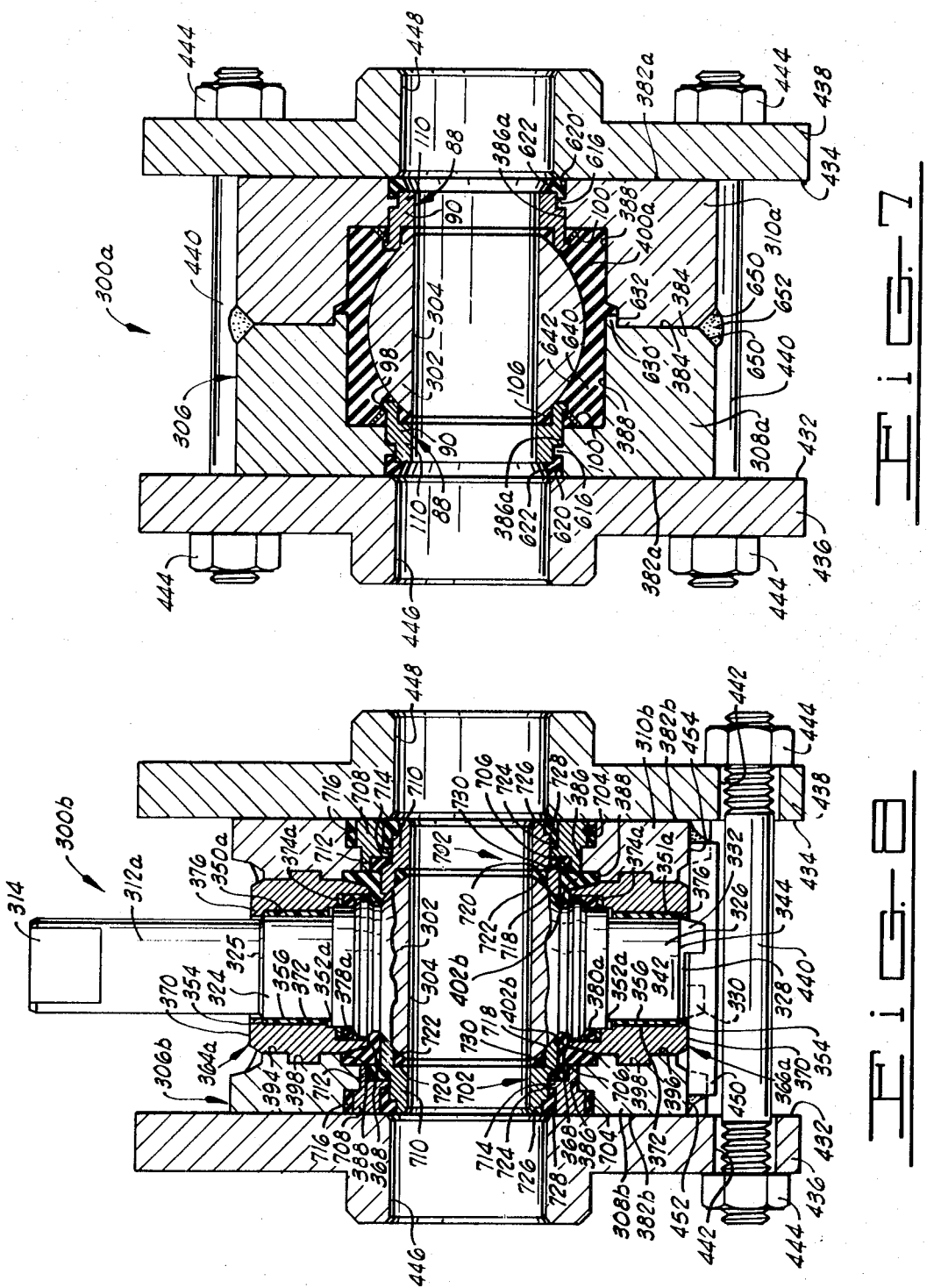

3,647,179

SPLIT BODY VALVE ASSEMBLY

BACKGROUND OF THE INVENTION

1. Field of the Invention

This invention relates generally to improvements in valve assemblies having two separate valve body components, and more particularly, but not by way of limitation, to a valve assembly having two separate body components in which the horizontal and vertical orientation of the two body components and the sealing integrity of the valve assembly are assured.

2. Description of the Prior Art

In the past there have been many attempts at providing a valve assembly in which the valve body was formed of two separate components. However, due to the fact that there is a practical limitations on manufacturing tolerances, which were achievable on a production-type basis, it has been found that the valve member, the valve stem and the seats have not retained a proper horizontal and vertical orientation with respect to the valve body after the two separate body components had been assembled thereabout.

The problems resulting from such an improper horizontal and vertical orientation are increased significantly in applications requiring the handling of fluids under a high pressure. This misalignment many times will also result in a premature wearing of the valve seats due to a blinding engagement being formed between the seats and the valve member, a loss of sealing integrity and an excessive amount of force having to be applied to the valve stem to effect the turning of the valve member.

SUMMARY OF THE INVENTION

The present invention basically contemplates a valve assembly having a valve member rotatably disposed therein. A valve stem is connected to the valve member such that the valve member may be rotated from a fully open to a fully closed position. The valve assembly includes a valve body having a first and a second body component combinable to form the valve body. A positioning means is disposed between a portion of the first body component and a portion of the second body component. The positioning means is adapted to cooperate with the valve stem and with the body components to properly orient the body components in a proper vertical and horizontal plane, with respect to each other, and with respect to the valve member and the valve stem. A seat is disposed in each end of the valve body. Each seat is sized to sealingly engage the adjacent portion of the valve member.

An object of the invention is to provide a valve assembly having two separate body components wherein the vertical orientation of the two separate body components in the assembled position is assured.

Another object of the invention is to provide a valve assembly having two separate body components wherein the horizontal orientation of the two separate body components in the assembled position is assured.

A further object of the invention is to provide a valve assembly having two separate body components wherein the proper orientation of the body components with respect to the valve member and the valve stem is assured.

One other object of the invention is to provide a valve assembly having two separate body components wherein the proper orientation of the seats with respect to the valve member is assured.

An additional object of the invention is to provide a valve assembly having two separate body components wherein the sealing integrity between the two body components and about the valve stem is assured.

Another object of the invention is to provide a valve assembly which is economical in construction and operation, and yet is quickly and easily repaired in the field.

Other objects and advantages of the invention will be evident from the following detailed description when read in conjunction with the accompanying drawings which illustrate the various embodiments of the invention.

BRIEF DESCRIPTION OF THE DRAWING

FIG. 1 is a sectional view of a valve assembly, assembled between two flanges.

FIG. 2 is an exploded view showing the valve member, the valve stem, the two body components and the two seats of the valve assembly of FIG. 1, in an unassembled position.

FIG. 3 is a view similar to FIG. 1, but showing a modified valve assembly.

FIG. 4 is a view similar to FIG. 1, but showing another modified valve assembly.

FIG. 5 is a view similar to FIG. 2, but showing an exploded view of some of the components of the modified valve assembly of FIG. 4.

FIG. 6 is a view similar to FIG. 1, but showing yet another modified valve assembly.

FIG. 7 is a view of the modified valve assembly of FIG. 6, taken substantially along the lines 7—7 of FIG. 6.

FIG. 8 is a view similar to FIG. 1, but showing still another modified valve assembly.

DESCRIPTION OF THE PREFERRED EMBODIMENTS

Referring to the drawings in detail, and to FIGS. 1 and 2 in particular, reference character 10 generally designates a valve assembly, basically comprising a spherically shaped valve member 12 rotatably disposed in a valve body 13. The valve body 13 basically comprises a first body component 14 and a second body component 15, which are secured in an assembled relationship in a manner to be more fully described below.

The valve ball 12 has a flow port 16 extending therethrough, and a rectangularly shaped recess 18 is formed in the exterior surface thereof. The recess 18 is sized to receive a rectangular end 20 formed on the lowermost end portion of a valve stem 22. The recess 18 in the valve ball 12 is sized with respect to the rectangular end 20 of the valve stem 22 to permit movement of the valve ball 12 in an axial direction when the valve ball 12 is rotated to the closed position. Thus, the valve ball 12 is of the type known in the art as a "floating" valve member, or valve ball.

An upper portion 24 of the valve stem 22 is adapted to receive and cooperate with a valve handle or other suitable operator (not shown) for turning the valve stem 22, thereby rotating the valve ball 12 from a fully open to a fully closed position. As well known in the art, various forms of valve handles and connections may be used, and therefore no further description is required herein.

The valve stem 22 also includes a flange portion 26 extending about the outer periphery thereof, generally adjacent the rectangular end 20, thereby forming an upwardly facing surface 28 encircling the valve stem 22. A groove 30 is formed in the outer periphery of the valve stem 22 generally between the upper end portion 24 and the rectangular end 20 thereof. The groove 30 is sized to receive a retaining ring 32, which is disposed therein. A recess 34 is formed in the valve stem 22 generally between the flange portion 26 and the groove 30 thereof. The flange portion 26, the retaining ring 32 and the recess 34 are provided to cooperate with a positioning ring 36, in a manner to be more fully described below.

In a preferred form, another groove 37 is formed in the valve stem 22, and an O-ring seal member 38 is disposed in the groove 37. The O-ring 38 is sized to sealingly engage the valve stem 22 and a portion of the positioning ring 36, thereby forming a fluidtight seal therebetween.

The positioning ring 36 is, in a preferred form, cylindrically shaped and constructed of a metal or reinforced plastic material. The positioning ring 36 has an outer periphery 39, an upper end 40, a lower end 42, and an aperture 44 which extends therethrough. The aperture 44 is sized to journally receive a portion of the valve stem 22. The recess 34 in the first valve stem 22 cooperates with the aperture 44 to reduce the contacting area between the positioning ring 36 and the valve stem 22. The outer periphery 39 is sized to cooperate with the body components 14 and 15 to assure a proper horizontal orientation therebetween, in a manner to be more fully described below.

A groove 46 is formed in the end 42 of the positioning ring 36, intersecting the aperture 44 thereof. The groove 46 forms a downwardly facing surface 48 encircling the positioning ring 36, for reasons which will be made apparent below.

An elastomeric seal member 49 is bonded in the groove 46. The seal member 49 is sized such that a portion thereof sealingly engages a portion of the flange portion 26 of the valve stem 22, thereby forming a fluidtight seat therebetween. Another portion of the seal member 49 sealingly engages a portion of a composite seat, in a manner to be more fully described below.

In the assembled position, as shown in FIG. 1, the downwardly facing surface 48 of the positioning ring 36 will engage the upwardly facing surface 28 of the valve stem 22, thereby positively locating the positioning ring 36 in one direction about the valve stem 22. The retaining ring 32 is sized and disposed about the valve stem 22 to engage the upper end 40 of the positioning ring 36, thereby cooperating with the flange portion 26 to secure the positioning ring 36 in the assembled position about the valve stem 22.

The positioning ring 36 includes a flange portion 50, which extends generally perpendicularly from the outer periphery 39 thereof. The flange portion 50 is provided to cooperate with the first body component 14 and the second body component 15 to positively locate the two body components 14 and 15 in a vertical plane, in a manner to be described more fully below.

In a preferred form, and as shown in FIGS. 1 and 2, the first and second body components 14 and 15 are similarly constructed, and like reference numerals are used to designate corresponding like portions of each body component 14 and 15. The first and second body components 14 and 15 are basically tubularly shaped, and each has opposite ends 52 and 54. A bore 56 extends axially through each body component 14 and 15, intersecting the respective opposite ends 52 and 54 thereof.

Each body component 14 and 15 also includes a pair of counterbores 58 and 60 extending a distance axially therein, intersecting the end face 54 of the respective body component 14 or 15. Each counterbore 58 has a greater diameter than the adjacent counterbore 60. Each body component 14 and 15 also includes a recess 62 intersecting the respective end face 54 and the adjacent counterbore 58 thereof.

A portion of an aperture 64 is formed in the upper portion of each body component 14 and 15, intersecting in the respective end face 54 thereof. A groove 66 is formed in each body component 14 and 15, encircling the respective aperture 64 therein. Each aperture portion 64 and each groove 66 are sized to encompass a portion of the positioning ring 36, and cooperate therewith to orient each body component 14 or 15 in a vertical and horizontal plane, as will be described below.

A counterbore 68 is formed in each aperture portion 64, and each counterbore 68 intersects the bore 60 through the respective body component 14 or 15. Each counterbore 68 is provided to cooperate with a seal member, as will be described in detail below.

In assembling the valve body 13 about the valve ball 12 and the valve stem 22, the positioning ring 36 is first disposed about the valve stem 22 and positively located in a vertical plane thereabout, in a manner as described before.

The first body component 14 is then moved into an assembled relationship with respect to the valve ball 12 and the valve stem 22, that is, a position wherein a portion of the flange portion 50 of the positioning ring 36 is slidingly and interconnectingly disposed in the recess 66 of the first body component 14. The flange portion 50 thereby cooperates with the recess 66 to positively locate the first body component 14 in a vertical plane with respect to the valve stem 22 and the valve ball 12, and in this position the valve ball 12 is movably and rotatably disposed in a portion of the bore 58 of the first body component 14. In this position, the aperture portion 64 of the first body component 14 will matingly engage a portion of the outer periphery 39 of the positioning ring 36, thereby locating the first body component 14 in a horizontal plane with respect to the valve stem 22 and the valve member 12.

The second body component 15 is then moved into an assembled relationship with respect to the valve stem 22 and the valve ball 12, that is, a position wherein a portion of the flange portion 50 of the positioning ring 36 is slidingly and interconnectingly disposed in the groove 66 of the second body component 15, and a portion of the valve ball 12 is movably and rotatably disposed in a portion of the counterbore 58 of the second body component 15. The flange portion 50 thereby cooperates with the recess 66 to positively locate the second body component 15 in a vertical plane with respect to the valve stem 22 and the valve ball 12. The aperture portion 64 of the second body component 15 will also matingly engage a portion of the outer periphery 39 of the positioning ring 36, thereby locating the second body component in a horizontal plane with respect to the valve stem 22 and the valve ball 12.

In the assembled position, the counterbores 58 of each of the body components 14 and 15 are aligned and cooperate to form a valve chamber 80 in the valve assembly 10. Thus, as shown in FIG. 1, valve ball 12 is movably and rotatably disposed in the valve chamber 80.

The bore 56 and the counterbore 60 in each of the body components 14 and 15 are sized to receive and cooperate with a seat assembly 88, which is movably disposed in each end of the valve assembly 10. Each seat assembly 88, as shown more clearly in FIG. 2, basically comprises a seat ring 90, having a valve member end 92 and a nonvalve member end 94. Each seat ring 90 is sized to slidingly fit in the counterbore 60 of the body component 14 or 15, and a portion of the valve member end 94 is sized to engage the wall formed by the respective counterbore 60 to limit the axial movement of each seat ring 90 in one direction.

The axial length of each seat ring 90, that is, the axial length between the valve member end 92 and the nonvalve member end 94 thereof, is sized such that, in an assembled position as shown in FIG. 1, a portion of each seat ring 90 extends axially into the valve chamber 80.

A radially extending rim 98 is formed on the outer periphery each seat ring 90 generally adjacent the respective valve member end 92 thereof. Each rim 90 is provided to cooperate with a spring 100. Each spring 100, as shown in FIG. 1, is sized and disposed such that, in an assembled position, one end of each spring 100 is in engagement with the wall formed between the counterbores 58 and 60, in one of the body components 14 or 15 and the opposite end of each spring 100 is in engagement with the rim 98 of one of the seat rings 90. Each spring 100 therefore cooperates with one of the body components 14 or 15 and the respective seat ring 90 to bias one of the seat rings 90 toward the respective end of the valve ball 12. In a preferred form, each spring 100 is embedded in a composite seat, as will be described in more detail below.

A seating surface 102 is formed on a portion of the valve member end 92 of each seat ring 90. Each seating surface 102 is sized to seatingly engage the adjacent exterior surface of the valve ball 12.

A groove 104 is formed in each seating surface 102, and an elastomeric seal member 106 is disposed in each groove 104. In a preferred form, each elastomeric seal member 106 is bonded in one of the grooves 104. Each elastomeric seal member 106 is sized to sealingly engage the adjacent exterior surface of the valve ball 12.

An axially extending flange portion 110 is formed on the nonvalve member end 94 of each seat ring 90, generally adjacent the outer periphery thereof. Each flange portion 110 is disposed and sized to slidingly fit in the bore 58 of one of the body components 14 or 15.

A composite seat 112, which is formed of an elastomeric-type material, is disposed generally in the valve chamber 80 of the valve assembly 10. More particularly, the composite seat 112 is bonded in the counterbores 58 of the first and second body components 14 and 15 and in the counterbores 68 of the aperture portions 64. A portion of the composite seat 112 also extends into the recess 62 of each body component 14 and 15, and is bonded thereto.

An aperture 116 is formed in the upper portion of the composite seat 112 generally adjacent the aperture portions 64 of the first and second body components 14 and 15. The aperture 116 of the composite seat 112, in a preferred form, is sized on a slightly smaller radius than the outer periphery of the positioning ring 36 so that, in the assembled position as shown in FIG. 1, the walls of the composite seat 112 formed by the aperture 116 sealingly engage the outer periphery 39 of the positioning ring 36, thereby forming a fluidtight seal therebetween.

As shown in FIG. 1, a seating surface 118 is formed about the inner periphery of the composite seat 112. The seating surface 118 is sized to sealingly and seatingly engage the valve ball 12 about the adjacent outer periphery thereof.

In a preferred form, the first and second body components 14 and 15 are placed in an assembled position, as shown in FIG. 1, and the composite seat 112 is formed in the valve chamber 80 an integral unit. In an alternate form, a portion of the composite seat 112 could be formed in each body component 14 and 15 separately. In the alternate form, the ends of the composite seat 112 generally adjacent the end 54 of each body component 14 or 15 are sized to extend axially beyond the respective end 54 so that, in the assembled position, the ends of the composite seat 112 adjacent the end 54 of the respective body component 14 or 15 will compressingly and sealingly engage, thereby forming a fluidtight seal between the first and second body components 14 and 15.

A pair of recesses, 120 and 122 are formed in the end face 52 of each body component 14 or 15. An elastomeric seal member 124 is bonded in the recesses 120 and 122 of each body component 14 or 15.

A portion 128 of each elastomeric seal member 124 extends radially from the respective recess 122 into the adjacent bore 56. Each portion 128 is sized to sealingly engage the flange portion 110 of one of the seat rings 90 during the operation thereof, as will be described in greater detail below. Another portion 130 of each elastomeric seal member 124 is sized to extend axially from the respective recess 120 beyond the end face 52 of one of the body components 14 or 15. Each portion 130 is sized to sealingly engage one end face 132 or 134 of a flange 136 or 138.

The flanges 136 and 138 are disposed on opposite sides of valve assembly 10, as shown in FIG. 1. The body components 14 and 15 and the flanges 136 and 138 are held in an assembled relationship by a plurality of circumferentially spaced bolts 140 that extend through apertures 142 in the flanges 136 and 138, and about the outer periphery of the valve body 13. Each of the bolts 140 is provided with a pair of threaded nuts 144 that engage the flanges 136 and 138.

Each flange 136 and 138 includes an opening 146 or 148 respectively, which in an assembled position is axially aligned and each is sized to connectingly receive the end of a conduit (not shown). The openings 146 and 148 of the flanges 136 and 138 cooperate with the seat assemblies 88 and the port opening 16 of the valve ball 12 to define a flow passageway through the valve assembly 10, when the valve ball 12 has been rotated to the open position, as shown in FIG. 1.

Operation of FIGS. 1 and 2

The valve assembly 10, and more particularly the seat assemblies 88, are constructed such that the fluid flow through the valve assembly 10 could be in either direction. However, for the purpose of clarity of description it will be assumed that upstream pressure exists in the opening 146 of the valve assembly 10. If the fluid flow were in the opposite direction, it is to be understood that the operation of the valve assembly 10 would be substantially the same, a salient difference being the opposite seat assembly 88 would function as the upstream seat assembly.

When the valve ball 12 is in the open position, as shown in FIG. 1, that is, the position wherein the port 16 of the valve ball 12 is axially aligned with the openings 146 and 148 of the flanges 136 and 138, fluid will flow through the valve assembly 10.

Each spring 100 biases one of the seat assemblies 88 into a sealing engagement with the valve ball 12, that is, a position wherein the seal member 106 of each seat assembly 88 engages an adjacent portion of the outer periphery of valve ball 12. Each seal member 106 thus forms a primary seal about the outer periphery of the valve ball 12, and substantially prevents migration of the fluid flow thereabout.

The seating surface 118 of the composite seat 112 is also in sealing engagement with the outer periphery of the valve ball 12, and provides a secondary sealing preventing fluid flow about the valve ball 12. The composite seat 112 also functions to maintain a sealing integrity between the two body components 14 and 15.

The aperture 116 in the composite seat 112 sealingly engages a portion of the outer periphery 39 of the positioning ring 36, thereby forming a fluidtight seal between the valve body 13 and the positioning ring 36. The seal member 49 provides a fluidtight seal between the composite seat 112 and the valve stem 22.

It should also be noted that many instances where an elastomeric seal member is bonded to a metal surface, and then cured the elastomeric material has a tendency to shrink somewhat. Therefore in a preferred form and as shown in FIGS. 1 and 2, the O-ring seal member 38 is provided about the valve stem 22 to form a secondary seal between the valve stem 22 and the positioning ring 36. Thus, the elastomeric seal member 49 and the O-ring seal member 38 cooperate to insure the sealing integrity between the valve stem 22 and the positioning ring 36.

The seal members 124, and more particularly each portion 130 thereof, engages the end face 132 or 134 of the flanges 136 or 138 to provide a fluidtight seal between the flanges 136 and 138 and the valve body 13.

When the valve ball 12 is turned to a closed position by the stem 22, the valve ball 12 is free to move downstream with respect to the stem 22, in the event a differential pressure is applied across the valve. Assuming that a higher pressure exists at the upstream opening 146 of the valve assembly, the valve ball 12 will be moved downstream and, in turn, move the seat assembly 88 located adjacent the downstream end of the valve assembly 10 downstream. The downstream seat assembly 88 in the valve ball 12 will continue moving downstream until the nonvalve member end 94 of the seat ring 90 engages the adjacent annular shoulder formed between the bore 56 and the counterbore 60 in the valve body component 15.

The elastomeric seal member 106 of the downstream seat assembly 88 is compressed between the seat ring 90 and the outer periphery of the valve ball 12, and therefore provides a fluidtight seal therebetween.

As the valve ball 12 moves downstream, the pressure existing in the upstream end of the valve assembly 10 will act on the nonvalve member end of the flange portion 110 of the upstream seat assembly 88, thereby moving the upstream seat assembly in a downstream direction following the movement of the valve ball 12. It is apparent from the foregoing that the upstream seat assembly 88 maintains a sealing engagement with the outer periphery of the valve ball 12 when the valve ball 12 is rotated to a closed position. As described before, the spring 100 will bias the upstream seat assembly 88 in the direction toward the valve ball 12, thereby augmenting the upstream pressure in moving the upstream seat assembly 88 into a sealing engagement with the valve ball 12.

It is apparent from the foregoing that the valve assembly 10 provides a valve having separate body components 14 and 15, thereby permitting the valve assembly 10 to be assembled or disassembled in a shorter period of time, thus reducing the cost of manufacture and the excessive loss of downtime encountered during field repair of the valve assembly 10. The proper vertical and horizontal orientation of the separate body components 14 and 15 is assured by the positioning ring 36.

The valve assembly 10 is also adapted to be assembled between a pair of flanges, such that the valve assembly 10 can be removed from an assembled position in a pipe line by merely moving the valve assembly in a vertical direction, after loosening the bolts. This feature is extremely important in some installation where because of limited space the pipe lines cannot be readily moved and adjusted to permit the valve assembly to be removed in a lateral or axial direction.

Embodiment of FIG. 3

The valve assembly 10a shown in FIG. 3 is constructed similar to the valve assembly 10, shown in FIGS. 1 and 2. The salient differences between the valve assembly 10a and the valve assembly 10 will be described in detail below.

The positioning ring 36a has additional counterbore 200 formed in the end 42 thereof, generally adjacent the aperture 44 therethrough. An O-ring seal member 202 is disposed in the counterbore 200. The O-ring seal member 202 is sized to sealingly engage a portion of the positioning ring 36a and a portion of the valve stem 22a about the outer periphery thereof, thereby forming a fluidtight seal therebetween. It is apparent from the foregoing that the O-ring seal member 202 functions to provide a fluidtight seal between the positioning ring 36a and the valve stem 22a in a manner similar to the O-ring seal member 38 of the valve assembly 10, thereby eliminating the necessity of having a groove and associated seal member carried by the valve stem 22a similar to the valve stem 22.

Each body component 14a and 15a has a counterbore 204 formed in the respective end face 54 thereof. The counterbores 204 of the body components 14a and 15a cooperate to form a valve chamber 205, when the valve assembly 10a is in the assembled position, as shown in FIG. 3. A seating surface 207 is formed in each body component 14a and 15a, generally between the respective bore 56 and the respective counterbore 204. Each seating surface 207 is sized to seatingly engage the exterior surface of the valve ball 12 in one position thereof.

A tapered portion 206 is provided adjacent one end of each counterbore 204. Each tapered portion 206 is sized and provided to reduce the quantity of elastomeric material required in the construction of a composite seat 208 which is bonded in the valve chamber 205. The tapered portions 206 also provide a reinforcing wall in closer proximity to the seating surface of the composite seat 208, thereby cooperating with the composite seat 208 to some degree to maintain the sealing integrity of the valve assembly 10a, which will be described in detail below.

In a preferred form, the body components 14a and 15a are placed in the assembled position, and the composite seat 208 is formed in the valve chamber 205 as a unitary structure. As an alternate form, a portion of the composite seat 208 could be formed in each body component 14a and 15a separately, having cooperating sealing surfaces in much the same manner as described before with respect to the composite seat 112 of the valve assembly 10, shown in FIG. 1.

A portion of the composite seat 208 also extends into the recesses 62 of each body component 14a and 15a, and is bonded thereto. Another portion of the composite 208 extends into the counterbores 68 of the aperture portions 64 and is bonded thereto.

An aperture 210 is formed in the upper portion of the composite seat 208 generally adjacent the aperture portions 64 of the first and second body components 14a and 15a. The aperture 210 of the composite seat 208, in a preferred form, is sized on a slightly smaller radius than the outer periphery of the positioning ring 36a so that, in an assembled position as shown in FIG. 3, the walls of the composite seat 208 formed by the aperture 210 sealingly engage a portion of the outer periphery 39 of the positioning ring 36a, thereby forming a fluidtight seal therebetween.

The inner periphery 212 of the composite seat 208 is spherically shaped and, in a preferred form, is formed on a slightly larger radius than the radius formed by the outer periphery of the valve ball 12, so that a gap exists between a portion of the inner periphery 212 and the adjacent portion of the outer surface of the valve ball 12. The gap, as shown in FIG. 3, is exaggerated for the purpose of clarity.

A sealing ring 214 is formed about each end of the composite seat 208, generally adjacent the bore 56 in each body component 14a or 15a, respectively. Each sealing ring 214 extends a distance radially from the inner periphery 212 of the composite seat 208, and a seating surface 216 is formed on the innermost periphery of each sealing ring 214. Each sealing ring 214 is sized such that, in an assembled position, each seating surface 216 will sealingly engage a portion of the exterior surface of the valve ball 12 generally adjacent one end thereof.

A flange ring 220 is formed on the end face 52a of each body component 14a and 15a. A recess 222 is also formed in the end face 52a of each body component 14a and 15a. Each recess 222 intersects a portion of one of the flange rings 220, as shown in FIG. 2.

An elastomeric seal member 226 is bonded to each recess 222. Each seal member 226 has a portion 228 thereof which is bonded to one of the flange rings 220, and a portion 230 thereof which is bonded to the wall formed in one of the body components 14a or 15a by the recesses 222.

A ring groove 232 is formed in the end faces 132a and 134a of each flange 136a and 138a, respectively. Each ring groove 232 is shaped and positioned to matingly receive one of the flange rings 220 on the body component 14a or 15a, including the adjacent portion 228 of one of the elastomeric seal members 226.

It is apparent from the foregoing that the flanges 136a and 138a cooperate with the body components 14a and 15a to provide an inner connection therebetween of the type generally known in the art as a "ring-joint" flange connection. In addition the portions 228 of each elastomeric seal members 226 cooperate with the respective ring 220, and the respective ring grooves 232 to provide an elastomeric sealing engagement therebetween. Therefore the valve assembly 10a combines the advantages of a ring-joint flange connection with a flexible-type sealing engagement.

In the assembled position, the portion 230 of each elastomeric seal member 226 engages one end face 132a or 134a of one flange 136a or 138a, respectively, thereby forming an additional sealing engagement therebetween.

Operation of FIG. 3

The valve assembly 10a will operate similar to the valve assembly 10, shown in FIGS. 1 and 2. When the valve ball 12 is turned to the closed position the valve ball 12 will be free to move or float a distance downstream due to interconnection between the rectangular end 20 of the valve stem 22a and the recess 18 of the valve ball 12.

The valve ball 12 will move in a downstream direction to a position wherein the exterior surface of the valve ball 12 seatingly and sealingly engages the seal ring 214 of the composite seat 208, which is disposed adjacent the downstream end thereof. The seal ring 214 adjacent the downstream end of the composite seat 208, will, therefore, be compressed by the valve ball 12 and a fluidtight sealing engagement will be formed therebetween. It should also be noted that in some high-pressure applications, the valve ball 12 may move downstream and deform the seal ring 214 to a position wherein the exterior surface of the valve ball 12 seatingly engage the downstream seating surface 207, due to the large pressure differential which may exist across the valve ball 12.

In the position of the valve ball 12 described above, the seal ring 214 adjacent the upstream end of the composite seat 208 is sized such that it may, under some conditions, remain in sealing engagement with the exterior surface of valve ball 12, but will function more in the nature of a secondary type seal.

It is apparent from the foregoing that the valve assembly 10a, and more particularly, the composite seat 208 therein, is adapted such that the flow through the valve assembly 10 could be in either direction, the seal rings 214 functioning to provide a fluidtight seal about the outer periphery of the valve ball 12 in a reverse although identical manner.

The seal member 49 bonded to the positioning ring 36a will function in substantially the same manner as described before to provide a fluidtight seal between the valve stem 22a the positioning ring 36a and the composite seat 208. The O-ring seal member 202 carried by the positioning ring 36a will provide a secondary-type sealing engagement between the positioning ring 36a and the valve stem 22a. Thus the O-ring seal 202 will function in a similar manner to the O-ring 38 of the valve assembly 10, the salient difference being that the O-ring 202 is carried by the flange portion 26 of the valve stem 22a in cooperation with the positioning ring 36a. The O-ring 202 may therefore be disposed about the valve stem 22a and the positioning ring 36a may then be positioned about the valve stem 22a, such that the O-ring 202 is compressed between the positioning ring 36a and the flange portion 26 of the valve stem 22a. This type of construction virtually eliminates the possibility of the O-ring 202 being pulled or forced partially out of its assembled position when the positioning ring 36a is assembled about the valve stem 22a, thereby insuring the sealing integrity between the positioning ring 36a and the valve stem 22a.

It is apparent from the foregoing that the valve assembly 10a retains most of the advantages of the valve assembly 10, in that valve assembly 10a is also adapted to be assembled and disassembled in a shorter period of time, thereby reducing the cost of manufacture and loss of downtime encountered during field repair of the valve assembly 10a. The vertical and horizontal orientation of the separate body components 14a and 15a is also assured by the positioning ring 36a cooperating with the adjacent portions of each body component 14a and 15a.

In addition to the above, the O-ring 202 in the valve assembly 10a is disposed about the valve stem 22a and supported thereabout in such a manner as to virtually eliminate the possibility of the O-ring being removed or partially removed from a groove when the positioning ring 36a is inserted over the valve stem 22a. Also the valve assembly 10a provides a modified ring-joint-type of flange connection, which may be more desirable in some applications, such as those involving the handling of fluids under high pressure.

Description of FIGS. 4 and 5

Another valve assembly, which is constructed in accordance with the invention, is shown in FIGS. 4 and 5, and is designated by the general reference character 300. The valve assembly 300 basically comprises a spherically shaped valve member 302 having a flow port 304 extending therethrough, rotatably disposed in a valve body 306. The valve body 306 basically comprises a first body component 308 and a second body component 310, which are secured in an assembled relationship, as shown in FIG. 1, in a manner to be more fully described below.

A first valve stem 312 is formed on the exterior surface of an upper portion of the valve ball 302 and extends radially upwardly therefrom, terminating with an uppermost end portion 314. The uppermost end portion 314 of the first valve stem 312 is adapted to receive and cooperate with a valve handle or other suitable operator (not shown) for turning the first valve stem 312, thereby rotating the valve ball 302 from a fully open to a fully closed position.

A pair of flange portions 316 and 318 are formed on the first valve stem 312 generally adjacent the exterior surface of the valve ball 302. Each flange portion 316 and 318 forms an upwardly facing surface 320 or 322 respectively, which encircles the outer periphery of the first valve stem 312. As shown in FIGS. 4 and 5, the flange portion 316 has a smaller diameter than the flange portion 318, for reasons which will be made apparent below.

A raised portion 324 is formed about the first valve stem 312 generally between the flange portion 316 and the uppermost end portion 314 thereof. The raised portion 324 forms an upwardly facing surface 325 and is sized to cooperate with a sleeve bearing and a positioning ring, in a manner to be more fully described below.

A second valve stem 326 is formed on the exterior surface of a lower portion of the valve ball 302 and extends radially downwardly therefrom, terminating with a lowermost end portion 328. A pair of radially extending key members 330 and 332 are formed on the lowermost end portion 328, for reasons which will be made apparent below.

A pair of flange portions 334 and 336 are formed on the second valve stem 328 generally adjacent the exterior surface of the valve ball 302. Each flange portion 334 and 336 forms a downwardly facing surface 338 or 340, respectively, which encircles the outer periphery of the second valve stem 328. As shown in FIGS. 4 and 5, the flange portion 336 has a smaller diameter than the flange portion 334, for reasons to be made apparent below.

A raised portion 342 is formed about the second valve stem 326 generally between the flange portion 336 and the lowermost end portion 328 thereof. The raised portion 342 forms a downwardly facing surface 344 and is sized to cooperate with a positioning ring and a bearing ring, in a manner to be more fully described below.

A sleeve bearing 350 is disposed about a portion of the first valve stem 312 and a sleeve bearing 351 is disposed about a portion of the second valve stem 326. In a preferred form, the sleeve bearings are similar and each is constructed of a reinforced plastic material, or other suitable bearing-type material.

Each sleeve bearing 350 and 351 is generally cylindrically shaped and has opposite ends 351 and 354, and a bore 356 extending therethrough. A flange portion 360 is formed on the end 352 of each sleeve bearing 350 and 351, and each flange portion 360 extends a distance generally perpendicularly from the respective sleeve bearing 350 or 351.

As shown in FIGS. 4 and 5, the sleeve bearing 350 is sized to encompass the raised portion 324 of the first valve stem 312, and more particularly the bore 356 therethrough is sized to generally encompass and journally contact the raised portion 324. The sleeve bearing 350 is adapted to be inserted downwardly about the first valve stem 312 to a position wherein the end 352 of the sleeve bearing 350 abuts the upwardly facing surface 320 of the flange portion 316, thereby positioning the sleeve bearing 350 in one direction about the first valve stem 312. In this position, the flange portion 360 of the sleeve bearing 350 will extend radially outwardly beyond the outer periphery formed by the flange portion 316 of the first valve stem 312, for reasons which will be made apparent below.

The sleeve bearing 351 is sized to encompass the raised portion 342 of the second valve stem 326, and more particularly the bore 356 therethrough is sized to generally encompass and journally contact the raised portion 342. The sleeve bearing 351 is adapted to be inserted upwardly about the second valve stem 326 to a position wherein the end 352 of the sleeve bearing 351 abuts the downwardly facing surface 340 of the flange portion 336, thereby positioning the sleeve bearing 351 in one direction about the second valve stem 326. In this position, the flange portion 360 of the sleeve bearing 351 will extend radially outwardly beyond the outer periphery formed by the flange portion 336 of the second valve stem 326, for reasons which will be made apparent below.

A positioning ring 364 is disposed about a portion of the sleeve bearing 350 and a positioning ring 366 is disposed about a portion of the sleeve bearing 351. In a preferred form, the positioning rings 364 and 366 are similar and each is constructed of a metal or reinforced plastic.

Each positioning ring 364 and 366 is generally cylindrically shaped and each has an outer periphery 367, an inner end 368, an outer end 370, and an aperture 372 which extends therethrough. The aperture 372 of the positioning ring 364 is sized to matingly encompass a portion of the sleeve bearing 350 and the aperture 362 of the positioning ring 366 is sized to matingly encompass a portion of the sleeve bearing 351. If desired, the sleeve bearings 350 and 351 may be bonded in the respective positioning rings 364 or 366.

A notch 374 is formed in the end 368 of each positioning ring 364 and 366, and each notch 368 encircles the respective aperture 372. An inwardly extending flange portion 376 is formed on the end 370 of each positioning ring 364 and 366.

In the assembled position, as shown in FIGS. 4 and 5, the flange portion 376 of the positioning ring 364 is sized to engage the end 354 of the sleeve bearing 350 and the upwardly facing surface 325 encircling the first valve stem 312, thereby positively locating the positioning ring 364 in one direction about the first valve stem 312. It is also apparent from the foregoing that the positioning ring 364 cooperates with the upwardly facing surface 320 to retain the sleeve bearing 350 in an assembled position about the first valve stem 312.

In the assembled position described above, the notch 374 of the positioning ring 364 will engage the flange portion 360 of the sleeve bearing 350, and the wall formed by the notch 374 will extend downwardly beyond the flange portion 360. The notch 374 of the positioning ring 364, and more particularly the wall formed by the notch 374, will cooperate with the flange portion 360 of the sleeve bearing 350 to retain an O-ring 378 in sealing engagement about the first valve stem 312, as shown in FIGS. 4 and 5.

The flange portion 376 of the positioning ring 366 is sized to engage the end 354 of the sleeve bearing 351 and the downwardly facing surface 344 encircling the second valve stem 326, thereby positively locating the positioning ring 366 in on direction about the second valve stem 326. The positioning ring 366 thereby cooperates with the downwardly facing surface 344 to retain the sleeve bearing 351 in an assembled position about the second valve stem 326. The notch 374 of the positioning ring 366, and more particularly the wall formed by the notch 374, will cooperate with the flange portion 360 of the sleeve bearing 351 to retain an O-ring 380 in sealing engagement about the second valve stem 326, as shown in FIGS. 4 and 5.

Each positioning ring 364 and 366 also includes a flange portion 381, which extends generally perpendicularly from the outer periphery 367 of each respective positioning ring 364 or 366. Each flange portion 381 is provided to cooperate with the first body component 308 and the second body component 310 to positively locate the two body components 308 and 310 in a vertical plane, in a manner to be more fully described below.

It is apparent from the foregoing and in a preferred form, the first and second valve stems 312 and 326 may be sized such that the sleeve bearings 350 and 351 and the positioning rings 364 and 366 are, respectively, identical and interchangeable, thereby reducing the cost of manufacture and facilitating the field repair of the valve assembly 300.

In a preferred form and as shown in FIGS. 4 and 5, the first and second body components 308 and 310 are constructed similar, and like reference numerals are used for corresponding like portions of each body component 308 and 310. The first and second body components 308 and 310 are basically tubular shaped and each has opposite ends 382 and 384. A bore 386 extends axially through each body component 308 and 310, intersecting the respective opposite ends 382 and 384 thereof.

Each body component 308 and 310 includes a counterbore 388 extending a distance axially therein, intersecting the end face 384 of the respective body component 308 or 310. Each body component 308 and 310 also includes a pair of counterbores 390 and 392 extending a distance axially therein, intersecting the end face 382 of the respective body components 308 or 310. Each counterbore 390 has a greater diameter than the adjacent counterbore 392, for reasons which will be made apparent below.

A portion of an aperture 394 is formed in the upper portion of each body component 308 and 310, intersecting the respective end face 384 thereof. Another portion of an aperture 396 is formed in the lower portion of each body component 308 and 310, intersecting the respective end face 384 thereof. In a preferred form, the apertures 394 and 396 are similar and are radially aligned, for reasons which will be made apparent below.

A pair of grooves 398 are formed in each body component 308 and 310. One of the grooves 398 encircles each aperture portion 394 and the other groove encircles each aperture portion 396 in each body component 308 and 310. Each aperture portion 394 and each groove 398 associated therewith are sized to encompass a portion of the positioning ring 364, and each aperture portion 396 and each groove 398 associated therewith are sized to encompass a portion of the positioning ring 366, for reasons to be made apparent below.

In assembling the valve body 306 about the valve ball 302 and the first and second valve stems 312 and 326, respectively, the positioning rings 364 and 366 are first disposed about the first and second valve stems 312 and 326, respectively, and positively located in a vertical plane thereabout, in a manner as described before.

The first body component 308 is then moved into an assembled relationship with respect to the valve ball 302 and the first and second valve stems 312 and 326, that is, a position wherein a portion of the flange portion 381 of the positioning ring 364 is slidingly and interconnectingly disposed in the recess 398 of the aperture portion 394, and a portion of the flange portion 381 of the positioning ring 366 is slidingly and interconnectingly disposed in the recess 398 of the aperture portion 396. In this position, the first and second valve stems 312 and 326 and the valve ball 302 are positively located in a vertical plane with respect to the first body component 308 and a portion of the valve ball 302 is movably and rotatably disposed in a portion of the counterbore 388 of the first body component 308.

The second body component 310 is then moved into an assembled relationship with respect to the valve ball 302 and the first and second valve stems 312 and 326, that is, a position wherein a portion of the flange portion 381 of the positioning ring 364 is slidingly and interconnectingly disposed in the recess 398 of the aperture portion 394, and a portion of the flange portion 381 of the positioning ring 366 is slidingly and interconnectingly disposed in the recess 398 of the aperture portion 396. In this position, the first and second valve stems 312 and 326 and the valve ball 302 are positively located in a vertical plane with respect to the second body component 310 and a portion of the valve ball 302 is movably and rotatably disposed in the counterbore 388 of the second body component 310.

In the assembled position, as shown in FIG. 4, the aperture portions 394 of the body components 308 and 310 matingly engage a portion of the outer periphery 367 of the positioning ring 364, and the aperture portions 396 of the body components 308 and 310 matingly engage a portion of the outer periphery 367 of the positioning ring 366. Each aperture portion 394 and 396 therefore is sized to cooperate with the adjacent outer periphery 367 of each positioning ring 364 or 366 to locate the body components 308 and 310 in a horizontal plane with respect to the valve stems 312 and 326 and the valve ball 302.

In the assembled position, the counterbores 388 of each of the body components 308 and 310 are aligned and cooperate to form a valve chamber 400 in the valve assembly 300. Thus, as shown in FIG. 4, the valve ball 302 is rotatably disposed in the valve chamber 400. A composite seal 402, which is formed of an elastomeric-type material, is disposed generally in the valve chamber 400 of the valve assembly 300. More particularly, the composite seal 402 is bonded in the bores 386 and the counterbores 388 of the body components 308 and 310.

An upper aperture 404 is formed in the composite seal 402. The upper aperture 404 is sized and disposed to sealingly engage the flange portion 318 about the first valve stem 312, thereby forming a fluidtight seal therearound. A lower aperture 406 is also formed in the composite seal 402. The lower aperture 406 is sized and disposed to sealingly engage the flange portion 334 about the second valve stem 326, thereby forming a fluidtight seal therearound.

As shown in FIG. 4, the composite seal 402, generally adjacent the aperture portions 404 and 406, is sized and shaped to sealingly engage an adjacent portion of each positioning ring 364 and 366, thereby forming a fluidtight seal about each positioning ring 364 and 366, respectively.

In a preferred form, the first and second body components 308 and 310 are placed in an assembled position, and the composite seal 402 is formed in the valve chamber 400 as an integral unit. In an alternate form, the ends of the composite seal 402 generally adjacent the end 384 of the respective body component 308 or 310 is sized to extend axially beyond the end 384, so that in the assembled position the ends of the composite seal 402 generally adjacent the end 384 of the respective body component 308 or 310 will compressingly and sealingly engage, thereby forming a fluidtight seal between the first and second body components 308 and 310.

The composite seal 402 and the counterbores 390 and 392 of each body component 308 and 310 are sized to cooperate with a pair of seat assemblies 408. In a preferred form the seat assemblies 408 are constructed identically and one of the seat assemblies 408 is disposed in each end of the valve assembly 300.

As shown more clearly in FIG. 5, each seat assembly 408 basically comprises a seat ring 410, having a flange portion 412 axially extending from one end thereof. A seating surface 414 is formed on the end of each seat ring 410 opposite the flange portion 412 end thereof. A groove 416 is formed in each seating surface 414 and an elastomeric seal member 418 is disposed in each groove 416. In a preferred form, each seal member 418 is bonded in a mating groove 416.

Each seat ring 410 is sized to be slidingly inserted axially into one end of the valve assembly 300, to an assembled position, as shown in FIG. 4. The seating surface 414 of each seat ring 410 is sized to seatingly engage the adjacent portion of the valve ball 302, and each elastomeric seal member 418 is sized to sealingly engage the adjacent portion of the valve ball 302, thereby forming a fluidtight seal therebetween.

Each seat assembly 408 also includes a retaining ring 420, having a radially inwardly extending flange portion 422 on one end thereof. The inner periphery of each flange portion 422 is sized to slidingly extend about the outer periphery of a portion of the flange portion of the respective seat rings 410. An O-ring seal member 424 is disposed compressingly between each flange portion 422 of each retaining ring 420 and the end of the respective seat ring 410, adjacent the respective flange portion 412. In the assembled position, as shown in FIG. 4, each O-ring seal member 424 is sized and disposed to provide a fluidtight seal between the respective seat ring 410, the adjacent retaining ring 420 and the adjacent portion of the composite seal 402.

An elastomeric seal member 426 is bonded to the end of each flange portion 412 opposite the end thereof formed integral with the seat ring 410. As shown more clearly in FIG. 5, a portion of each seal member 426 is also bonded to a portion of the respective flange portion 422 and the adjacent inner periphery of the respective seat ring 420, thereby providing a fluidtight seal therebetween.

An axially outwardly extending bead 428 is formed on each elastomeric seal member 426 generally adjacent the respective retaining ring 420, and another elastomeric bead 430 is bonded to the end of the retaining ring 420 opposite the flange portion 422 end. Each bead 428 and each bead 430 is sized to extend axially beyond the adjacent retaining ring 420 and to compressingly and sealingly engage the one of the end faces 432 or 434 of the flanges 436 or 438.

The flanges 436 and 438 are disposed on opposite sides of the valve assembly 300, as shown in FIG. 4. The body components 308 and 310 and the flanges 436 and 438 are held in an assembled relationship by a plurality of circumferentially spaced bolts 440 that extend through apertures 442 in the flanges 436 and 438, and about the outer periphery of the valve body 306. Each of the bolts is provided with a pair of threaded nuts 444 that engage the flanges 436 and 438.

Each flange 436 and 438 includes an opening 446 or 448, respectively, which is an assembled position, are axially aligned and sized to receive the ends of conduits (not shown). The openings 446 and 448 cooperate with the seat assemblies 408 and the port opening 304 of the valve ball 302 to define a flow passageway through the valve assembly 300, when the valve ball 302 has been rotated to the open position, as shown in FIG. 4.

In a preferred form and as shown in FIG. 4, a plate 450 is secured to the valve body 306. The plate 450 is sized such that a portion thereof is disposed in a recess 452 in the first body component 308 and another portion thereof is disposed in a recess 454 in the second body component 310, generally adjacent the lowermost end portion 328 of the second valve stem 326. After the body components 308 and 310 have been placed in the assembled position, the plate 450 is secured to each body component 308 and 310 in a suitable manner, such as by welding.

The plate 450 is also sized and disposed such that the key member 332 extends on one side of the plate 450 and the other key member 330 extends on the opposite side of the plate 450. The key members 330 and 332 are sized and positioned to engage the plate 450 in such a manner that the rotational movement of the second valve stem 326 and therefore the valve ball 302 is limited to 90°, thereby assuring the position of the valve ball 302 in either the open or closed position.

Operation of FIGS. 4 and 5

It is apparent from the foregoing description that valve assembly 300 basically provides a ball valve 302 journaled at an upper and a lower portion thereof between two separate body components 308 and 310. The fluid flow through the valve assembly 300 could be in either direction, however for the purpose of clarity, it will be assumed that the upstream pressure exists in the opening 446 of the valve assembly 300. If the fluid flow were in the opposite direction, it is to be understood that the operation of the valve assembly 300 would be substantially the same, a salient difference being the opposite seat assembly 308 would function as the upstream seat assembly.

When the valve ball 302 is rotated to the open position, as shown in FIG. 4, that is, the position wherein the port 304 thereof is axially aligned with the openings 446 and 448 of flanges 436 and 438, fluid will flow through the valve assembly 300.

The beads 428 or 430 of each seat assembly 308 sealing engage the end face 432 or 434, respectively, and provide fluidtight seals between the body components 308 and 310 and the flanges 436 and 438. In addition, the compressing engagement between each bead 430 and the respective end faces 432 or 434 biases the adjacent flange portion 412 in a direction generally toward the valve ball 302. Therefore in the assembled position, each seat ring 410 is biased toward the valve ball 302, thereby establishing the initial sealing engagement between each elastomeric seal member 418 and the adjacent portion of the valve ball 302.

Each O-ring 424 is sized such that, in the assembled position, it is compressingly secured between the adjacent flange portion 422 and the adjacent seat ring 410. Each O-ring 424 therefore cooperates with the adjacent retaining ring 420 to bias the adjacent seat ring 410 into sealing engagement with the adjacent portion of the valve ball 302. The two biasing forces on each seat ring 410 described above maintain each seat ring 410 uniformly biased toward the valve ball 302 in a controlled manner, thereby preventing an overbiasing and the resulting binding engagement between each seat ring 410 and the adjacent portion of the valve ball 302.

The sealing integrity between first and second valve stems 312 and 326 and positioning rings 364 and 366, respectively, is initially established by the adjacent aperture portions 404 or 406, of the composite seal 402. The O-ring seal members 378 and 380 provide a secondary stem seal in the event the composite seal 402 is partially destroyed or otherwise loses its sealing effectiveness.

The composite seal 402 establishes the sealing integrity between the body components 308 and 310 and the positioning rings 364 and 366, in a manner described before.

When the valve ball 302 is rotated to the closed position, a differential pressure is applied across the valve ball 302. The thrust created by this differential pressure is carried by the sleeve bearings 350 and 351. Therefore, the sleeve bearings 350 and 351 not only provide the bearing surface to contact the adjacent portions of the first and second valve stems 312 and 326, but also provide the surface to carry the thrust created across the valve ball 302 when rotated to the closed position.

It is apparent from the foregoing that the components of the valve assembly 300 adjacent the first and second valve stems 312 and 326 are subject to some wearing. The valve assembly 300 is not only constructed such that the sleeve bearings 350 and 351 may be constructed of a particularly suitable bearing material, but are also adapted to be easily and inexpensively replaceable in a manner which assures proper positioning about the first and second valve stems 312 and 326 during filed repair of the valve assembly 300.

It is apparent from the foregoing that the valve assembly 300 provides a valve having separate body components 308 and 310, thereby permitting the valve assembly 300 to be assembled or disassembled in a reduced period of time, thus reducing the cost of manufacture and the excessive loss of downtime encountered during the field repair of the valve assembly 300. The valve assembly 300 is also constructed to have a valve member 302 journaled in the valve body 306 at an upper and a lower portion thereof, which is particularly advantageous in high-pressure applications.

The proper vertical and horizontal orientation of the separate body components 308 and 310 is assured by the pair of positioning rings 364 and 366. Since, in the embodiment shown in FIGS. 4 and 5, the valve stems 312 and 326 are not journaled in the positioning rings 364 and 366, the material used for constructing such positioning rings 364 and 366 is not thereby limited.

The valve assembly 300 is also adapted to be assembled between a pair of flanges, such that the valve assembly 300 can be removed from an assembled position in a pipeline by merely moving the valve body 306 in a vertical direction after loosening the bolts.

Embodiments of FIGS. 6 and 7

The valve assembly 300a shown in FIGS. 6 and 7 is constructed similar to the valve assembly 300 described before. Therefore, only the salient differences will be described below.

The first and second valve stems 312a and 326a are similar to the first and second valve stems 312 and 326 shown in FIGS. 4 and 5. The first and second valve stems 312a and 326a, in lieu of a pair of flange portions formed about each adjacent the valve ball 302, have an additional raised portion 602 adjacent the valve ball 302. Each raised portion 602 is of a larger diameter than the adjacent raised portion 324 or 342, and therefore forms a rim 604 about the first and second valve stems 312 and 326, respectively.

An outwardly extending flange ring 606 is formed about each raised portion 602, generally between the end thereof adjacent the valve ball 302 and the end thereof adjacent the raised portion 324 or 342. The radially extending inner and outer surfaces 608 and 610 of each flange ring 606 are, in a preferred form, tapered and are provided for reasons to be made apparent below.

The sleeve bearings 350a and 351a, shown in FIG. 6, are similar to the sleeve bearings 350 and 351, shown in FIGS. 4 and 5. The salient difference being that there is no flange portion formed on the end 352a of each sleeve bearing 350a and 351a, and each sleeve bearing 350a and 351a is sized such that the end 352a thereof engages one of the rims 604 to limit the movement in one direction of each sleeve bearing 350a or 351a.

Each positioning ring 364a and 366a is constructed similar to the positioning rings 364 and 366, shown in FIGS. 4 and 5, the salient difference being that each notch 374a in each positioning ring 364a and 366a is also sized to receive and cooperate with a bearing ring 612. Each bearing ring 612 is, in a preferred form, constructed of the same material as the sleeve bearings 350a and 351a and functions in a manner similar to the flange portions 360, shown in FIGS. 4 and 5, in that each bearing ring 612 cooperates with the adjacent groove 374a to compressingly retain an O-ring 378a or 380a between each bearing ring 612 and the respective outer surface 610 of each flange portion 616. Therefore the O-rings 378a and 380a provide a sealing engagement between each positioning ring 364a and 366a and the first or second valve stems 312a and 326a, respectively.

The seat assemblies of the valve assembly 300a are constructed similar to the seat assemblies 88, shown in FIGS. 1 and 2, and are therefore designated by that same reference numeral in FIGS. 6 and 7.

The first and second body components 308a and 310a are constructed similar to the first and second body components 308 and 310, shown in FIGS. 4 and 5, the salient differences being the modifications necessary to accommodate the seat assemblies 88.

A radially inwardly extending flange portion 616 is formed on each body component 308a and 310a about each bore 386a generally between the wall formed by the respective counterbores 388 and the respective end face 382a. Each flange portion 616 and the adjacent bore 386a portion is sized to cooperate with one of the seat assemblies 88 in a manner similar to one of the bores 56 and the respective counterbore 60 of the valve assembly 10, shown in FIGS. 1 and 2.

A counterbore 620 is formed in the end face 382a of each body component 308a and 310a. An elastomeric seal member 622 is disposed in each counterbore 620. Each elastomeric seal member 622 is sized such that in the assembled position a portion thereof sealing engages the adjacent end face 432 or 434 of the flange 436 or 438 and another portion thereof sealingly and biasingly engages the adjacent end of the respective flange portion 110.

As shown in FIG. 7, the first body component 308a also includes a flange portion 630 extending axially from the end face 384 thereof adjacent the counterbore 388 therein. The flange portion 630 is sized and disposed to slidingly fit into a groove 632 formed in the end face 384 of the second body component 310a to a position near, but not abutting, the wall formed by the groove 632 in the second body component 310a. Thus, as the two body components 308a and 310a are moved into an assembled position, the flange portion 630 of the first body component 308a cooperates with the groove 632 of the second body component 310a to interlock the first and second body components 308a and 310a in a proper vertical and horizontal relationship.

A composite seat 640, which is formed of an elastomeric-type material, is disposed generally in the valve chamber 400a of the valve assembly 300a. In a preferred form, the first and second body components 308a and 310a are moved into an assembled relationship, and the composite seat 640 is bonded in the valve chamber 400a. In an alternate form, a portion of the composite seat 640 could be formed as separately in each body component 308a and 310a, in a manner similar to that described before.

As shown in FIGS. 6 and 7, a seating surface 642 is formed about the inner periphery of the composite 640. The seating surface 642 is sized to sealingly and seatingly engage the valve ball 302 about the adjacent outer periphery thereof.

An upper and a lower aperture 644 and 646, respectively, are formed in the composite seat 640. The upper aperture 644 is sized and disposed to accommodate the adjacent portions of the first valve stem 312a and to sealingly engage the first valve stem 312a about the raised portion 602 thereof. The lower aperture 646 is sized and disposed to accommodate the adjacent portions of the second valve stem 326a and to sealingly engage the second valve stem 326a about the raised portion 602 thereof.

A portion of the composite seat 640 adjacent the upper and lower aperture portions thereof is shaped to sealingly engage the tapered inner surface 608 of the adjacent flange ring 606. Therefore, fluid which might migrate about the exterior surface of the valve ball 302 toward the first or second valve stem 312a or 326a, will act upon the portions of the composite seat 640 adjacent the upper or the lower apertures 644 or 646 therein, and bias that portion of the composite seat 640 into a tighter sealing engagement with the respective flange ring 606. The composite seat 640 therefore provides a pressure responsive type of sealing engagement about the valve stems 312a and 326a.

As shown more clearly in FIG. 6, another portion of the composite seat 640 is shaped and positioned to sealingly engage a portion of each positioning ring 364a and 366a in a manner similar to that described before with respect to the composite seal 402 and the positioning rings 364 and 366, shown in FIGS. 4 and 5.

A pair of spring 100 are embedded in the composite seat 640 and each spring 100 is sized and disposed to engage and cooperate with the adjacent seat assembly 88 in a manner similar to that described before with respect to the valve assembly 10, shown in FIGS. 1 and 2.

As shown in FIG. 7, each body component 308a and 310a also includes a tapered portion 650 about the outer periphery thereof adjacent the respective end faces 384. The tapered portions 650 are sized and disposed such that in the assembled position they cooperate to form a cavity to accommodate a weld bead 652. Therefore, the body components 308a and 310a are secured together by welding about the outer periphery thereof, which may be desirable in some applications, particularly those involving high pressure.

Operation of FIGS. 6 and 7

The valve assembly 300a, shown in FIGS. 6 and 7, will operate somewhat similar to the valve assembly 300, shown in FIGS. 4 and 5. One of the salient differences being that the valve assembly 300a is adapted to utilize the seat assembly 88 similar to the valve assembly 10, shown in FIGS. 1 and 2.

The seat assembly 88 and the composite seat 640 will cooperate to provide a fluid seal about the valve ball 302, when the valve ball 302 has been rotated to the open or the closed position, in a manner similar to that described with respect to the valve assembly 10. One difference is that the valve member 302 is not a floating valve member as was the valve member 12 of the valve assembly 10, but is journally supported at an upper and lower portion thereof in the valve body 306a.

Each seal member 622, cooperating with the adjacent end face 432 or 434 of the flange 436 or 438, biases the respective seat assembly 88 into a sealing engagement with the adjacent portion of the valve ball 302. This biasing effect is augmented by the springs 100 in a manner similar to that described with respect to the valve assembly 10.

It is apparent from the foregoing that the valve assembly 300a retains all of the advantages of the valve assembly 300 and in addition provides a different type of insertable sealing structure suitably adapted to a journaled ball valve. The valve assembly 300a also provides the additional horizontal and vertical locating factor of the flange portion 630 of the first body component 308a cooperating with the groove 632 in the second body component 310a.

The adaptation of the body components 308a and 310a so that they can be secured together in an assembled position by welding is another advantage particularly important in some applications, such as those involving high pressure.

Embodiment of FIG. 8

The valve assembly 300b, shown in FIG. 8, is constructed similar to the valve assembly 300, shown in FIGS. 4 and 5 and the valve assembly 300a shown in FIGS. 6 and 7. The salient difference being the modified seat assemblies 702.

To receive and cooperate with the respective seat assembly 702, each body component 308b and 310b has been modified to include a counterbore 704 intersecting the end face 382b of the respective body component. As shown in FIG. 8, the composite seal 402b, has also been modified to the extent that it does not include a portion extending along each bore 386 in the body components 308b and 310b, but rather includes a portion extending radially inwardly beyond the bores 386, thereby providing an annular planar surface 706 therearound.

The seat assemblies 702 are constructed similar, and each seat assembly 702 includes a retaining ring 708 and a seat ring 710. Each retaining ring 708 is sized such that in the assembled position, as shown in FIG. 8, one end thereof abuts the adjacent end face 432 or 434 of the flange 436 or 438, respectively, and the opposite end of each retaining ring 708 abuts the adjacent wall formed by counterbore 704 in the body component 308b or 310b. Each retaining ring 708 is thereby positively located in an axial direction in the respective body component 308b or 310b.

Each retaining ring 708 also includes a flange portion 712 extending axially from the end thereof opposite the end thereof in engagement with the flange 436 or 438. Each flange portion 712 is sized to sliding fit into the bore 386 in the respective body component 308b or 310b, thereby locating each retaining ring 708 in a radial direction in the respective body component. Each retaining ring 708 also includes a flange portion 714 extending radially from the respective inner periphery thereof. As shown in FIG. 8, the flange portions 712 and 714 cooperate to form an annular groove about each retaining ring 708.

An elastomeric seal member 716 is bonded to the outer periphery of each retaining ring 708. Each seal member 716 is sized such that, in the assembled position, a portion of thereof sealingly engages the adjacent body component 308b or 310b about the counterbore 704 therein. Another portion of each seal member 716 is sized to sealingly engage the adjacent end face 432 or 434 of the flange 436 or 438.

A seating surface 718 is formed on one end of each seat ring 710. Each seating surface 718 is sized and disposed to seatingly engage the adjacent portion of the valve ball 302. A groove 720 is formed in each seating surface 718 and an elastomeric seal member 722 is bonded in each groove 720. Each seal member 722 is sized and disposed to sealingly engage the adjacent portion of the valve ball 302.

A groove 724 is formed in the outer periphery of each seat ring 710 intersecting the respective end thereof, opposite the end on which the respective seating surface 718 is formed. The outer periphery of each groove 724 is sized such that, in the assembled position, a portion of each seat ring 710 formed by each groove 724 slidingly abuts the outer periphery of the adjacent flange portion 714, thereby locating each seat ring 710 in a radial direction with respect to the adjacent and cooperating retaining ring 708.

An additional annular groove 726 is formed in the end of each seat ring 710 opposite the end in which the respective seating surface 718 is formed adjacent the respective groove 724. Each groove 726 is of a larger diameter than the adjacent groove 724.

A seal member 728 is disposed between each retaining ring 708 and the adjacent seat ring 710. Each seal member 728 is bonded to the groove 726 to a portion of the groove 724 in one of the seat rings 710, and to the outer periphery and a portion of the flange portion 714 of the adjacent retaining ring 708.

Another seal member 728 is located between and bonded to each retaining ring 708 and the adjacent seat ring 710. Each seal member 730 has a portion which extends axially therefrom and is sized to sealingly engage the adjacent portion of the composite seal 402b generally adjacent the respective planar surface 706. Each seal member 730 therefore cooperates with the adjacent portions of the composite seal 402b to form a fluidtight seal therebetween.

Operation of FIG. 8

It is apparent from the foregoing that the valve assembly 300b, shown in FIG. 8, will operate similar to the valve assemblies 300 and 300a described before. The salient difference being the seat assemblies 702.

Each seat assembly 702 cooperates with the composite seal 402b to provide the sealing integrity of the valve assembly 300b in a manner similar to that described with respect to the seat assemblies 408, shown in FIG. 4, one of the differences being that each seat assembly 702 is constructed such that the retaining ring 708 and the seat ring 710 are adapted such that they can be more readily constructed as an integral unit. The seal members 728 and 730 bonded between each retaining ring 708 and each adjacent seat ring 710 will provide the sufficient interconnection therebetween, such that each seat assembly 702 can be easily inserted axially into an assembled position.

The valve assemblies described above are all adapted such that the valve bodies can be constructed using two separate body components. This particular feature reduces the time required to assemble each of the valve assemblies and, in some instances, the time required to disassemble some of the valve assemblies. Therefore, the cost of manufacture and repair of the valve assemblies is considerably reduced.

Not only do the valve assemblies described above have the advantages of separate body components, but each valve assembly also includes separate interconnecting components which are adapted to cooperate with the respective body components to assure the vertical and horizontal alignment of each of the body components with respect to the associated valve stems, valve member, and seat assemblies. Each of the valve assemblies described above also includes seat assemblies and seals which are particularly adapted to assure the sealing integrity of a valve assembly having separate body components.

Changes may be made in the construction and arrangement of the parts or elements of the various embodiments disclosed herein without departing from the spirit and scope of the invention as defined herein.

What is claimed is:

1. A valve assembly comprising:
a valve member;
a first valve stem having an upper and a lower end, said lower end being adapted to be connected to the valve member for turning the valve member from a fully open to a fully closed position;
a valve body comprising:
a first body component, having opposite ends and a bore extending therethrough, a groove formed in a portion of one end of a first body component, said first body component being disposed about a portion of the valve member such that a portion of the valve member is disposed in a portion of the bore of the first body component;
a second body component, having opposite ends and a bore extending therethrough, said second body component being disposed about a portion of the valve member, such that one end thereof faces the end of the first body component having the groove formed therein, a groove formed in a portion of the end of the second body component facing the end of the first body component, and a portion of the valve member disposed in a portion of the bore of the second body component;
positioning means disposed between a portion of the first body component and a portion of the second body component, a flange portion formed on a portion of the positioning means, a portion of the flange portion being sized and disposed to slidingly fit in the groove in the first body component and another portion of said flange portion being sized and disposed to slidingly fit into the groove in the second body component, said flange portion being sized to cooperate with said groove to positively locate the first and the second body components in a vertical plane with respect to the positioning means, an aperture formed through a portion of the positioning means sized to encompass a portion of the first valve stem, a portion of the positioning means engaging a portion of the first valve stem to locate the positioning means in a vertical plane about said first valve stem; and
seat means providing a seal between the valve body and the valve member.

2. The valve assembly of claim 1 wherein the positioning means is defined further as being of a cylindrical shape and having opposite ends.

3. The valve assembly of claim 2 wherein the aperture through the positioning means is sized to journally engage a portion of the first valve stem.

4. The valve assembly of claim 2 wherein the means to locate the positioning means in a vertical plane about the first valve stem, includes a groove about a portion of the first valve stem, and a retaining ring removably disposed in said groove, said retaining ring being sized and disposed to engage one end of the positioning means to limit the movement thereof in one direction.

5. The valve assembly of claim 4 wherein the means to locate the positioning means in a vertical plane about the first valve stem is defined further to include a flange portion formed about a portion of the first valve stem, thereby providing an upwardly facing surface encircling the first valve stem, said upwardly facing surface being sized and disposed to engage the end of the positioning means opposite the end thereof in engagement with the retaining ring to limit the movement of the positioning means in one direction.

6. The valve assembly of claim 4 wherein the means to locate the positioning means in a vertical plane about the first valve stem is defined further to include a flange portion formed about a portion of the first valve stem, thereby providing an upwardly facing surface encircling the first valve stem, and wherein the positioning means includes a groove in the end thereof opposite the end in engagement with the retaining ring forming a downwardly facing surface encircling said positioning means, said downwardly facing surface being sized and disposed to engage and cooperate with the upwardly facing surface about the first valve stem to limit the movement of the positioning means in one direction.

7. The valve assembly of claim 6 wherein the valve stem includes a groove thereabout; and an O-ring seal disposed in said groove, said O-ring being sized and disposed to sealingly engage the positioning ring, thereby forming a fluid seal between the first valve stem and the positioning means.

8. The valve assembly of claim 6 wherein the positioning means is defined further to include an elastomeric seal member disposed in a portion of the groove in the positioning means, said seal member being sized to sealingly engage a portion of the first valve stem, thereby forming a seal therebetween.

9. The valve assembly of claim 8 wherein the positioning means is defined further to include an O-ring seal member disposed in a portion of the groove in the positioning means, said last-mentioned O-ring being sized to sealingly engage a portion of the first valve stem, thereby forming a seal therebetween.

10. The valve assembly of claim 1 wherein the end faces of the first and the second body components facing each other are sized to abut to limit the axial load on the positioning means.

11. The valve assembly of claim 1 defined further to include a sleeve bearing means in the positioning means and disposed about a portion of the first valve stem, said sleeve bearing means being sized to journally contact a portion of said first valve stem.

12. The valve assembly of claim 1 defined further to include a second valve stem having an upper and a lower end, said upper end being connected to the valve member; and a second positioning means around the second valve stem between a portion of the first body component and a portion of the second body component; said second positioning means being adapted to locate the first and the second body components in a vertical plane about the valve member.

13. The valve assembly of claim 12 wherein the valve body is defined further to include another groove in a portion of the end of the second body component facing one end of the first body component, and another groove in a portion of the end of the first body component facing said end of the second body component; and wherein the second positioning means is defined further to include a horizontally extending flange portion, a portion of said last-mentioned flange portion being sized and disposed to slidingly fit into said last-mentioned groove in the first body component and another portion of said last-mentioned flange portion being sized and disposed to slidingly fit into said last-mentioned groove in the second body component, said last-mentioned flange portion being sized to cooperate with said last-mentioned grooves to locate the first and the second body components in a vertical plane with respect to the second positioning means.

14. The valve assembly of claim 12 wherein the second positioning means includes an aperture extending therethrough and opposite ends; and a sleeve bearing in the aperture of the second positioning means journally receiving the second valve stem.

15. The valve assembly of claim 12 wherein the seat means includes an elastomeric composite seat being formed in a portion of the bore of the first body component and a portion of the bore in the second body component, said composite seat having a seating surface formed thereon, being sized and disposed to seatingly and sealingly engage a portion of the exterior surface of the valve member in one position thereof, said composite seat having an upper aperture through a portion thereof, said upper aperture being sized and disposed to accommodate a portion of the first valve stem and sealingly engage a portion of the first valve stem about the periphery thereof, said composite seat having a lower aperture through a portion thereof, said lower aperture being sized and disposed to accommodate a portion of the second valve stem and sealingly engage a portion of the second valve stem about the periphery thereof.

16. The valve assembly of claim 1 wherein the valve member is defined further as being spherically shaped having a flow port extending therethrough.

17. The valve assembly of claim 16 wherein the valve member includes a recess in the exterior surface thereof, said recess being sized to receive a portion of the lower end of the first valve stem such that the valve member is free to move downstream when the valve member is rotated to the closed position.

18. The valve assembly of claim 1 wherein the seat means includes an elastomeric composite seat formed in a portion of the bore of the first body component and a portion of the bore in the second body component, said composite seat having a seating surface formed thereon and being sized and disposed to seatingly and sealingly engage a portion of the exterior surface of the valve member in one position thereof.

19. The valve assembly of claim 18 wherein the composite seat includes an aperture through a portion thereof, said aperture being sized and disposed to accommodate a portion of the first valve stem and to sealingly engage a portion of the first valve stem about the periphery thereof.

20. The valve assembly of claim 19 wherein the composite seat is defined further to include a portion sized and disposed to sealingly engage the positioning means, thereby forming a fluid seal therebetween.

21. The valve assembly of claim 18 wherein the composite seat includes a pair of seal rings, each seal ring extending radially from the seating surface of the composite seat adjacent one end thereof, each seal ring having a sealing surface formed thereon, said sealing surfaces being sized to engage a portion of the exterior surface of the valve member on opposite sides thereof.

22. The valve assembly of claim 18 wherein the seat means is defined further to include a pair of seat assemblies, one seat assembly being disposed in a portion of the bore of the first body component; and one seat assembly being disposed in a portion of the bore of the second body component, each seat assembly includes: a seat ring sized to sliding fit in the bore of the respective component, each seat ring having a seating surface formed on one end thereof, each of said seating surfaces being sized to seatingly engage a portion of the valve member; and an elastomeric seal member disposed in each seating surface, each elastomeric seal member being sized to sealingly engage a portion of the valve member.

23. The valve assembly of claim 22 wherein the composite seat includes a spring in each body component having opposite ends, each spring being embedded in one end of the composite seat in a position such that one end of the spring engages a portion of the respective body component and the opposite end thereof engages a portion of one of the seat rings, thereby biasing the respective seat ring toward the valve member.

24. The valve assembly of claim 23 wherein a portion of each seat ring is exposed to the pressure existing in the bore of the respective body component such that the fluid pressure biases the seat ring in a direction toward the valve member.

25. The valve assembly of claim 1 wherein the valve body is defined further to include a portion of an aperture formed in an upper portion of the end of the second body component facing one end of the first body component, said aperture portion intersecting the bore in the second body component; and a portion of an aperture formed in an upper portion of the end of the first body component facing said end of the second body component, said aperture portion intersecting the bore in the first body component; and wherein the positioning means is defined further to include an outer periphery, a portion of said outer periphery being sized to matingly engage a portion of the aperture portion in the second body component and another portion of said outer periphery being sized to matingly engage a portion of the aperture portion in the first body component, said outer periphery thereby being sized to cooperate with said aperture portions to locate the first and second body components in a horizontal plane.

26. The valve assembly of claim 25 wherein the groove formed in the first body component is further defined as being formed in the aperture portion therein; and wherein the groove formed in the second body component is further defined as being formed in the aperture portion therein.

* * * * *